United States Patent [19]

Rooney

[11] Patent Number: 4,636,122
[45] Date of Patent: Jan. 13, 1987

[54] JOINING AND MOUNTING DEVICE

[76] Inventor: James F. Rooney, 54 Poplar Swamp Rd., Bethany, Conn. 06525

[21] Appl. No.: 808,097

[22] Filed: Dec. 12, 1985

[51] Int. Cl.⁴ ............................................... F16B 13/06
[52] U.S. Cl. ........................................ 411/45; 411/54; 411/55
[58] Field of Search .................. 411/44, 45, 54, 55, 411/60, 61; 52/698, 704

[56] References Cited

U.S. PATENT DOCUMENTS

| | | |
|---|---|---|
| 1,381,428 | 6/1921 | Peelle ................................. 411/55 |
| 2,309,122 | 1/1943 | Keenan ............................... 411/44 |
| 2,381,050 | 8/1945 | Hardinge ............................ 411/55 |
| 4,263,833 | 4/1981 | Loudin ................................ 411/55 |
| 4,330,230 | 5/1982 | Giannuzzi .......................... 411/55 |
| 4,560,312 | 12/1985 | Grady ................................ 411/55 |

FOREIGN PATENT DOCUMENTS

| | | | |
|---|---|---|---|
| 2345612 | 10/1977 | France ................................. 411/61 |
| 549447 | 10/1956 | Italy .................................... 411/55 |
| 344832 | 4/1960 | Switzerland ........................ 411/55 |

*Primary Examiner*—Carl D. Friedman
*Assistant Examiner*—Dan W. Pedersen
*Attorney, Agent, or Firm*—Norman B. Rainer

[57] ABSTRACT

A device is provided which can join pre-drilled substrates such as panels, and can establish a threaded attachment post securely anchored to a substrate. The device is comprised of a hollow sleeve, and an internal rotatable core. When the device is inserted into a hole, and the core is rotated relative to the sleeve, prongs in the inserted extremity of the sleeve are forced into tight engagement with the hole. The opposite, uninserted extremity of the sleeve is provided with external threading, useful for general mounting purposes.

8 Claims, 3 Drawing Figures

JOINING AND MOUNTING DEVICE

BACKGROUND OF THE INVENTION

This invention concerns a device for joining two abutting structures and for providing a threaded post securely emergent from the surface of a structure.

Aside from conventional fasteners such as nails, screws, staples and rivets, the prior art is replete with examples of expandable joining devices adapted to pass through a hole in an outer substrate such as a panel or beam and into or through an underlying anchoring substrate whereby both substrates are releasibly drawn into tight abutment. Such expandable joining devices afford certain efficiencies and versatility in construction techniques not provided by conventional fasteners. However, many expandable joining devices are restricted to uses wherein both substrates must have through-type holes, and others are limited to applications wherein the anchoring substrate must have a blind or bottomed hole.

Numerous devices are known for providing a threaded mounting post upon the surface of a structure such as a wall, floor or beam. Some of said threaded post devices are not, however, capable of joining two substrates as would a joining device, and many of such devices are not of a removable, re-usable design. The structural integrity of the mounting post with respect to the surface it is anchored in is an important feature which has been compromised in certain prior art devices in the interest of other design considerations. Furthermore, the mounting post must be resistant to loosening with the effects of vibration. It is found that prior joining devices have achieved functional versatility only by virtue of costly features of construction or characteristics which weaken the holding strength of the device.

It is accordingly an object of the present invention to provide a device for providing a threaded mounting post securely emergent from the surface of an anchoring substrate.

It is another object of this invention to provide a device as in the foregoing object adapted to enter a pre-formed hole in said substrate and to expand following such entry.

It is a further object of the present invention to provide a device of the aforesaid nature adapted for use with either through or bottomed holes in said anchoring substrate.

It is yet another object of this invention to provide a device of the aforesaid nature which can be removed from engagement with said substrate and re-used.

It is a still further object of the present invention to provide a device of the aforesaid nature capable of joining an outer substrate to an anchoring substrate.

These objects and other objects and advantages of the invention will be apparent from the following description.

SUMMARY OF THE INVENTION

The above and other beneficial objects and advantages are accomplished in accordance with the present invention by a joining and mounting device for engaging a pre-drilled substrate comprising:

(a) a hollow sleeve of generally circular cylindrical outer contour elongated upon a center axis and having contiguous rearward and forward portions terminating at opposed first and second extremities of the sleeve, respectively, said rearward portion having externally disposed threading and opposed flat sections recessed into said threading adjacent said first extremity, and an internal axially centered first circular bore beginning at said first extremity and terminating within said forward portion in an outwardly directed shoulder, said forward portion having an internal axially centered second circular bore of larger diameter than said first bore and extending between said shoulder and said second extremity, slots in said forward portion parallel to said axis defining at least two outwardly displaceable prongs, and bearing means intruding radially into the sleeve (b) an elongated rotatable core member adapted to be disposed within said sleeve, having a helical groove which engages said bearing means, and first and second extremities positioned adjacent the corresponding first and second extremities of the sleeve, said extremities of the core having torque receiving means, said second extremity having a mandrel whose diameter is larger than the diameter of said second bore, whereby (c) application of torque to said core member from either extremity causes it to travel axially within the sleeve so that the mandrel enters the second extremity of the sleeve with attendant outward displacement of said prongs.

In another aspect of the invention, a locking collar threadably engages the rearward portion of said sleeve, said collar having a forward perimeter for abutting the outwardly directed face of said substrate, and external means for receiving turning torque.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
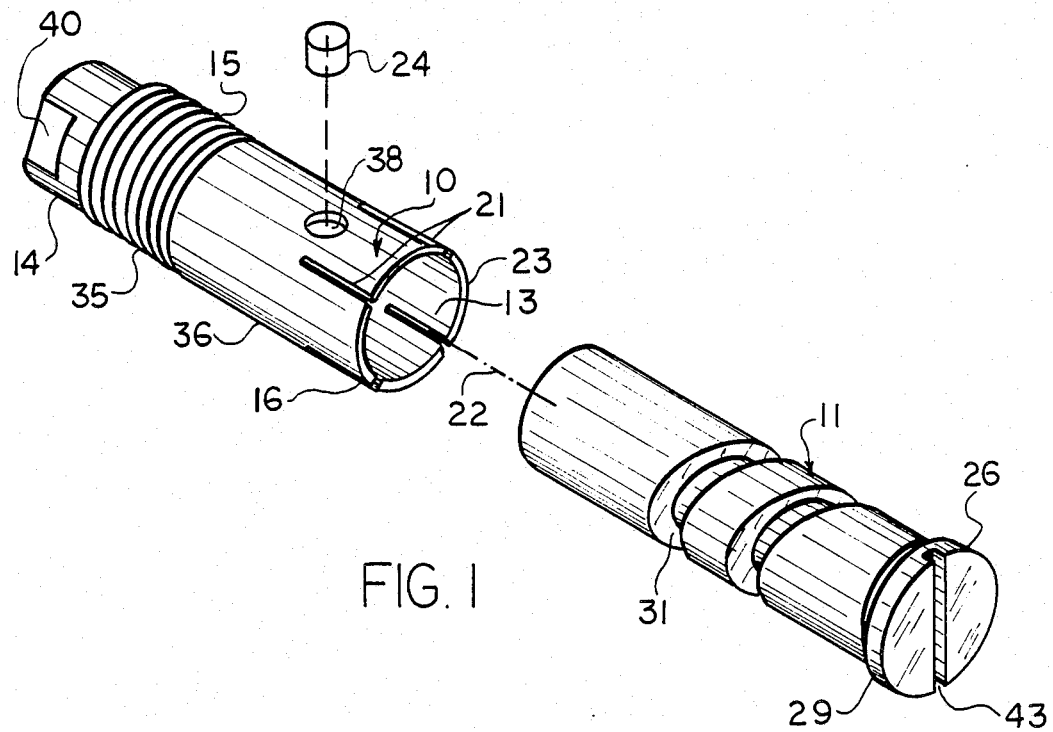
FIG. 1 is an exploded perspective view of an embodiment of the device of this invention.
Figure 2:
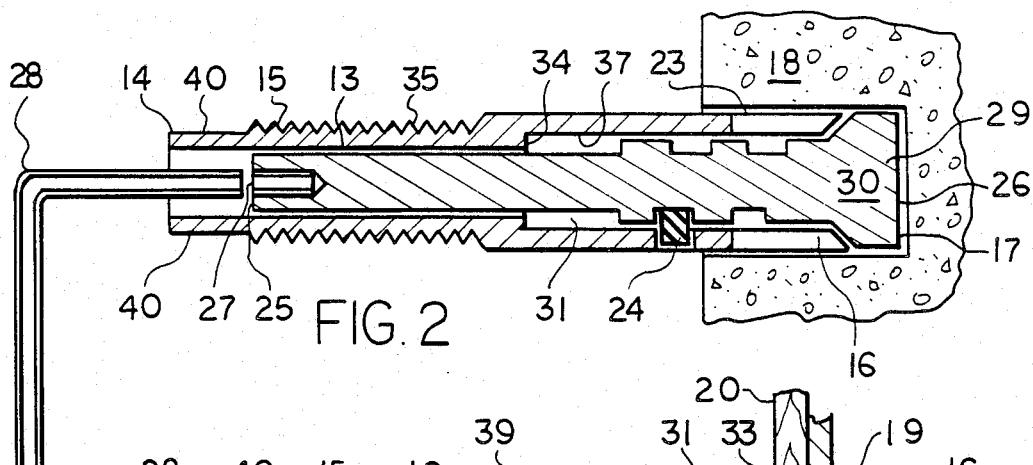
FIG. 2 is a sectional side view of the device of FIG. 2 shown inserted into a bottomed hole of an anchoring substrate and prior to expansion of the device to its operative configuration.
Figure 3:
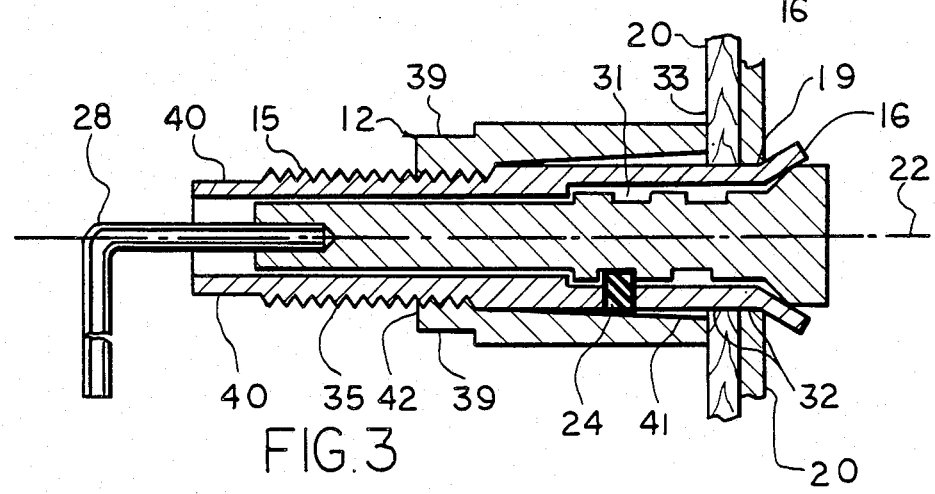
FIG. 3 is a sectional side view of the device of FIG. 1 with the addition of a locking collar and shown in operative association with two panel substrates held together by the device.

Referring to FIGS. 1 and 2, an embodiment of the device of the present invention is shown comprised of hollow sleeve 10 which houses rotatable core member 11. In the embodiment of FIG. 3, a locking collar 12 threadably engages sleeve 10.

Sleeve 10 is of generally circular cylindrical outer contour elongated upon a center axis 22 and having contiguous rearward and forward portions 35 and 36, respectively, terminating at opposed first and second extremities of the sleeve 14 and 16, respectively. Rearward portion 35 has externally disposed male threading 15 and opposed flat sections 40 recessed into said threading adjacent said first extremity.

A first circular bore 13 is axially centered within said rearward portion and terminates within said forward portion in outwardly directed shoulder 34. Forward portion 36 has an axially centered second circular bore 37 of larger diameter than bore 13 and extending between shoulder 34 and second extremity 16. Elongated slots 21 within said forward portion are coextensively aligned with said axis and open upon extremity 16, thereby defining prongs 23 as integral portions of said sleeve. A bearing post 24, which may be affixed to the sleeve or radially moveable with respect to the sleeve through aperture 38, intrudes radially into the sleeve. Second extremity 16 is adapted to enter a circular hole such as the bottomed hole 17 in anchoring substrate 18 or the through holes 19 of panel structures 20.

Core 11, axially disposed within said sleeve, is comprised of a first extremity 25 positioned adjacent first extremity 14 of the sleeve, and second extremity 26 positioned adjacent second extremity 16 of the sleeve. First extremity 25 of the core is provided with torque-receiving means in the form of recess 27 adapted to accommodate an allen wrench 28, not a part of this invention. Second extremity 26 of the core is provided with a mandrel 29 whose exterior diameter is larger than the internal diameter of second bore 37. The exterior face of extremity 26 is provided with a slot 43 which receives a flat-bladed screwdriver for application of torque. This is an alternative means of torque application.

An annular tapered shoulder 30 extends inwardly and rearwardly from the mandrel, merging with the remainder of the core member. A helical groove 31 is disposed within the core adjacent its second extremity. Bearing post 24 engages said helical groove in a manner such that, when the core member is turned, mandrel 29, initially outside the sleeve, is drawn into bore 37. Such movement of the mandrel causes the prongs to be outwardly expanded, as shown in FIG. 3.

As exemplified in FIG. 2, the device of this invention may be used to tightly engage an anchoring substrate. In such manner, the threaded portion 15 may be used to secure machinery or other items.

As shown in FIG. 3, the device is utilized to cause the joinder of two adjacent flat panels 19 by insertion through through-going holes 32 therein. When the second extremity 16 of the sleeve is inserted beyond said panels, the mandrel is activated by applying torque to either extremity of the core while holding the sleeve against turning movement, thereby causing expansion of the prongs. The expansion of the prongs exerts a compressive force from behind the engaged panels.

The exemplified embodiment of locking collar 12 has a cylindrical external configuration having opposed flat sections 39 which constitute torque-receiving means. The interior of the collar is provided with a smooth-walled portion 41 which is flared slightly outwardly, directed toward and terminating in forwardly directed rim 33. The rearwardly directed portion of collar 12 is provided with internal threading 42 adapted to engage the threading 15 of the sleeve. When the collar is threadably tightened onto the sleeve, it drives bearing post 24 into engagement with helical groove 31, and places rim 33 in tight abutment with the face of the outermost panel 20. By virtue of such arrangement, the two panels are tightly held together, and the threaded extremity of the sleeve may be used for the mounting of other items.

In other uses of the device, a panel having a through going hole may be joined to a substrate such as a wooden wall beam having a bottomed hole. In applications where the device will not be intended for the subsequent mounting of other items upon its threaded portion, said threaded portion may be of much shorter length. The several components of the device may be fabricated of metal or engineering grade plastics.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A joining and mounting device for engaging a pre-drilled substrate comprising:
   (a) a hollow sleeve of generally circular cylindrical outer contour elongated upon a center axis and having contiguous rearward and forward portions terminating at opposed first and second extremities, respectively, said rearward portion having externally disposed threading and opposed flat sections recessed into said threading, and an axially centered first circular bore beginning at said first extremity and terminating within said forward portion in a shoulder directed outwardly from said axis, said forward portion having an axially centered second circular bore of larger diameter than said first bore and extending between said shoulder and said second extremity, slots in said forward portion parallel to said axis defining at least two outwardly displaceable prongs, and bearing means intruding radially into the sleeve,
   (b) an elongated rotatable core member adapted to be disposed within said sleeve, having a helical groove which engages said bearing means, and first and second extremities positioned adjacent the corresponding first and second extremities of the sleeve, said extremities of the core having torque receiving means, said second extremity having a mandrel whose diameter is larger than the diameter of said second bore, whereby
   (c) application of torque to said core member from either extremity causes it to travel axially within the sleeve so that the mandrel enters the second extremity of the sleeve with attendant outward displacement of said prongs.

2. The device of claim 1 further provided with a locking collar which threadably engages the rearward portion of said sleeve, said collar having a forward perimeter adapted to abut said substrate, and means for receiving turning torque.

3. The device of claim 1 wherein the opposed flat sections recessed into the threading of the sleeve are located adjacent said first extremity.

4. The device of claim 1 wherein said bearing means intrudes into the second bore of said sleeve.

5. The device of claim 1 wherein the forward portion of said sleeve is provided with a radially directed aperture.

6. The device of claim 5 wherein said bearing means is slidably positionable within said radially directed aperture.

7. The device of claim 2 wherein said locking collar has a smooth-walled interior portion which is flared outwardly toward and terminating in said forward perimeter.

8. The device of claim 7 wherein the smooth-walled interior portion of said locking collar serves to drive the bearing means into engagement with the helical groove of said core member.

* * * * *